United States Patent [19]
Swenson

[11] 3,988,778
[45] Oct. 26, 1976

[54] SYSTEM FOR RANDOM, TIME ACCURATE ACCESS TO RECORDED MATERIAL

[75] Inventor: Richard M. Swenson, Ridgecrest, Calif.

[73] Assignee: The United States of America as represented by the Secretary of the Navy, Washington, D.C.

[22] Filed: Feb. 10, 1975

[21] Appl. No.: 548,648

[52] U.S. Cl. .......... 360/72; 360/88
[51] Int. Cl.[2] .......... G11B 15/18
[58] Field of Search .......... 360/72, 88

[56] References Cited

UNITED STATES PATENTS

| | | | |
|---|---|---|---|
| 3,423,743 | 1/1969 | Silverman | 360/72 |
| 3,435,418 | 3/1969 | Evans | 360/72 |
| 3,499,976 | 3/1970 | Lemelson | 360/72 |
| 3,809,302 | 5/1974 | Malyon | 360/72 |
| 3,852,814 | 12/1974 | Johnson et al. | 360/72 |

*Primary Examiner*—Jay P. Lucas
*Attorney, Agent, or Firm*—R. S. Sciascia; Roy Miller

[57] ABSTRACT

A tape search system for automatically retrieving a particular segment on a video tape in which the segments to be retrieved are indicated at the time of recording by cuing the audio track and causing a parallel dump in the up-down counter which counts the number of recording seconds. The information of each dump is placed in a different memory register. Each cue number corresponds to the memory location of desired information that can be retrieved by selecting the appropriate cue number(s).

10 Claims, 2 Drawing Figures

RELAY
MEMORY SELECTOR
24
CLOCK PULSE TO MEMORY DECODER
18
RESET
SN7494
SN7491A
MEMORIES
20
COUNTER
22
MANUAL REWIND
MANUAL FOREWARD
MANUAL STOP
GB811A
REWIND
FOREWARD
STOP
TAPE DRIVE COMMAND CIRCUIT
30

SYSTEM FOR RANDOM, TIME ACCURATE ACCESS TO RECORDED MATERIAL

BACKGROUND OF THE INVENTION

In the field of video tape recording it is sometimes desirable to permit rapid access to specific portions of recorded infomation. Previously, specific portions of the recorded information could only be located through trial and error by rapidly moving the tape in forward and/or rewind increments until the desired portion was found. The inefficiency of that technique pointed up the need for a device to automatically locate a particular segment of recorded data on the video tape. To achieve this, the presently invented tape search unit places a cue on the recorded area of interest during recording and allows for automatic return to the cued portion with a minimum of effort. One application of the present invention is in reconnaissance or military aircraft wherein the speed of today's and tommorow's aircraft requires that cues be distinguishable when no longer than a second apart in order for the system to be effective due to the distance an aircraft will cover in one second. The preferred embodiment of the present invention is shown to be digital in design and employing integrated circuits wherever possible for size and weight considerations and is recommended where such considerations are important alghough the present invention can be implemented with other components that will perform the same or similar functions.

BRIEF DESCRIPTION OF THE DRAWING

The FIG, shown in two parts 1A and 1B, is a schematic diagram of the preferred embodiment of the present invention.

DESCRIPTION OF THE PREFERRED EMBODIMENT

Figure 1A:
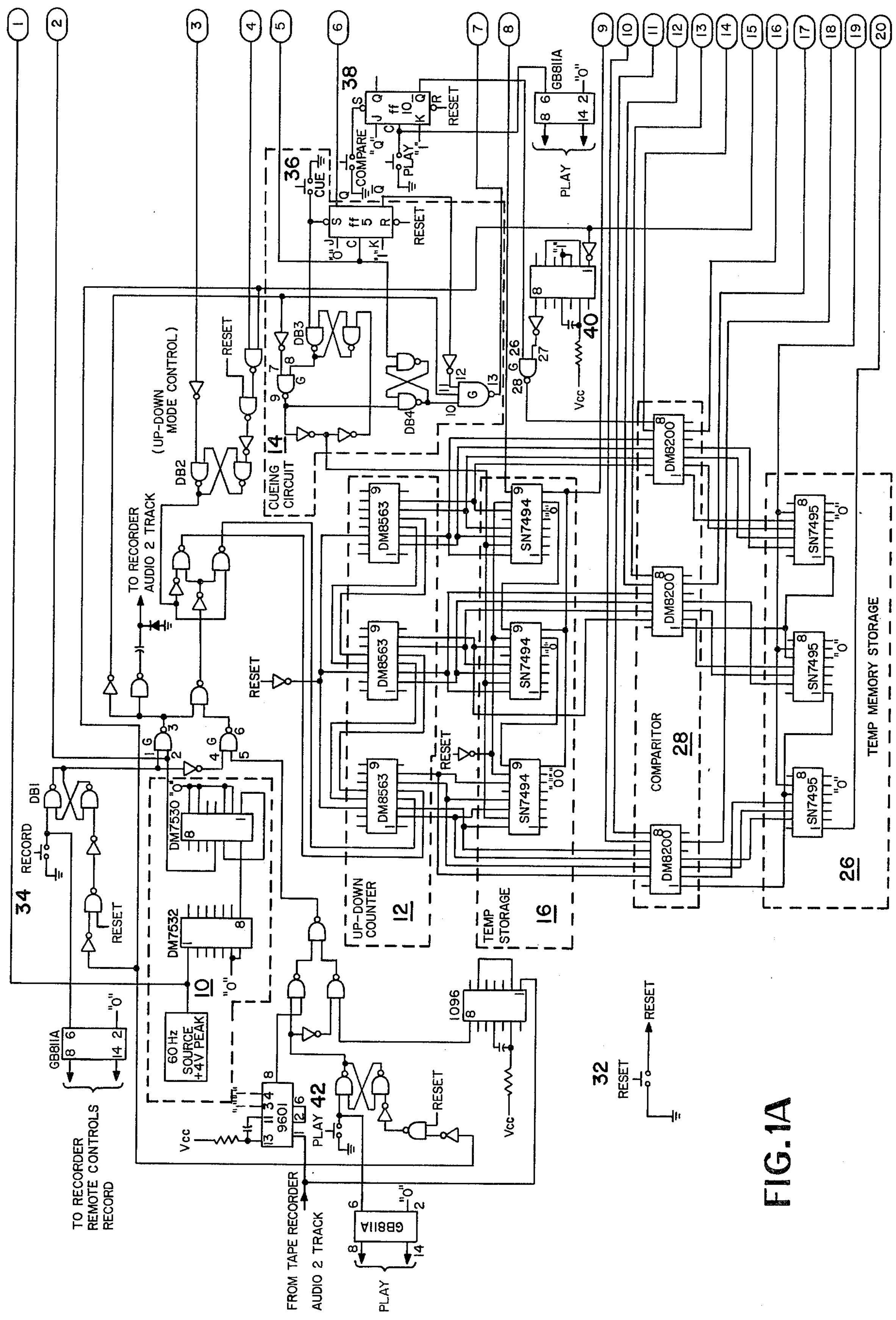
Figure 1B:
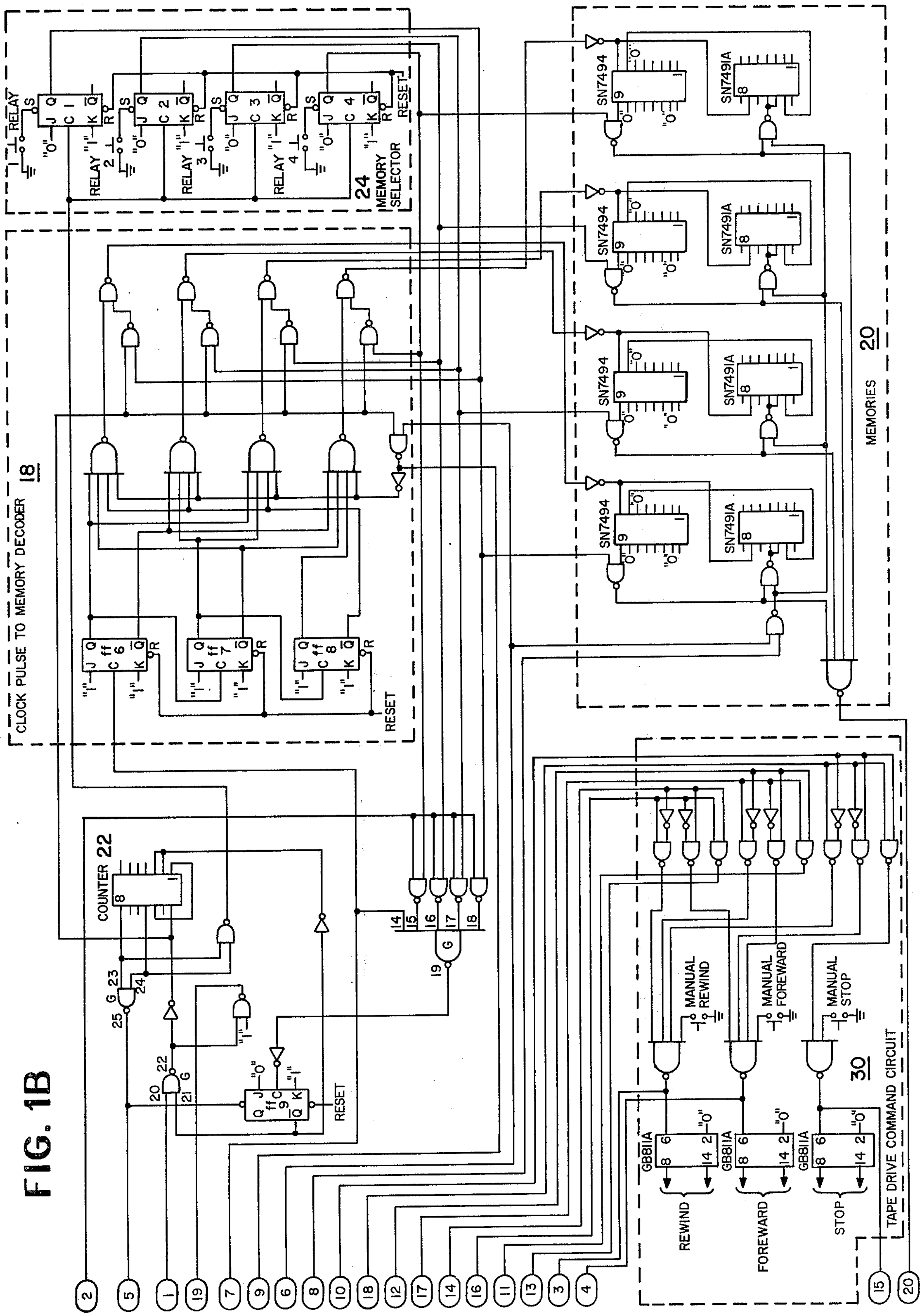

The present invention shown by the example in the Figure places time marks on the otherwise unused audio track of such as a video tape at one-second intervals while the recorder to which the present invention is connected is in the record mode of operation. The present invention may be used with video tape wherein the second audio track of the video tape can be employed, with sound recording tape including cassettes that can be used for, such as, recording music wherein a separate track is added to the tape to accept the time marks provided by the present invention or one of the tracks otherwise used for recording sound is instead used to record the time marks, and any other such recording system wherein it is desirable to retrieve selected portions of recorded material.

In general, the present invention adapted for use by a tactical aircraft having a video recorder operates as follows: an up-down counter is incremented by "one" simultaneously with the time marks placed on the audio track, and thus counts the number of seconds of recording. Anytime the pilot sees a target during recording he pushes a cue button or switch that causes a parallel dump of the present number in the up-down counter into a temporary storage shift register. Each time the cue is pushed, the information appearing at that time is placed in a separate memory register.

During the period the pilot is over a target area and until he flies to a safe loitering zone, the video tape recorder is still recording, and signals are being placed on the audio track. The up-down counter now has a different number than the number in the memory registers. The pilot can now select any one of the cues he previously placed on tape. Each separate cue number corresponds to the memory location of information desired. When the pilot selects a memory location, the number stored in that register will be serially shifted to a register for comparison with the number presently in the up-down counter. At the same time, the information is also rerouted back into the memory register to prevent loss of data.

The pilot now activates a compare button. This enables the last of at least two four-bit comparitors to compare the four most significant bits in the up-down counter and the storage register. If this comparison shows that the up-down counter has the greater number, the video tape recorder is automatically placed in the rewind mode. If the number is smaller, the recorder is placed in the forward mode. Then the second four-bit comparitor is activated and the process is repeated until the least significant four-bits are reached. When the last comparison is equality, the recorder receives a stop instruction and the comparitors are disabled by use of a one-shot multivibrator. This allows the tape to come to a complete halt for the one-shot period. If the recorder overshoots the recorded portion selected before it stops the comparitor will be automatically enabled and the process will continue until the tape stops exactly on the equality point.

The embodiment depicted in the drawing includes clock 10, up-down counter 12 for sequentiallyy counting the lapse time, cuing circuit 14 for transferring the current count in up-down counter 12 to temporary storage 16 and enabling clock pulse to memory decoder 18. Temporary storage 16 holds the cued count until it is transferred into memory 20. Thereafter, temporary storage 16 and cuing circuit 14 are cleared by counter 22 in preparation for another cue by the operator. Clock pulse to memory decoder 18 clocks the number in temporary storage 16 at a 60Hz rate and transfers it to memory 20 for storage.

The present invention also includes means for automatically retrieving cued portions of the tape, which means in the embodiment described includes memory selector 24, temporary memory storage 26 for temporarily storing the memory selected, comparitor 28 for comparing the memory selected with the then current number in up-down counter 12 which is representative of current tape position. Also included is tape drive command circuit 30 which automatically commands the tape drive to rewind if the number from memory is smaller than the number in up-down counter 12; if the number is larger the forward command is given; and so on until equality is reached and maintained. At that point the selected portion is available for replay.

The operator initializes the embodiment shown in the Figure by pushing reset button 32 which resets up-down counter 12 to zero and sends all the controlling gates in flip flops to their proper state. Then to initiate recording he pushes record button 34 which starts the recorder and sends debouncer one (DB1) to a "One" state and holds it. A "One" at debouncer one (DB1) allows a one cycle per second pulse to be conveyed from clock 10 through G3 to the recorder and placed on the tape. It also permits up-down counter 12 to be clocked up one each pulse and places a "zero" on G4 preventing any spurious pulses from the tape through G5 to clock the up-down counter.

Thereafter, when the pilot sees a target or other scene he would like to be able to retrieve he pushes cue button 36. Thereby, debouncer 3 (DB3) is sent to a "One" and flip flop 5 is preset. The next time a one cycle per second pulse is presented by clock 10 causing G3 to go to "One" G9 will become a "zero" which loads the count then present in up-down counter 12 into temporary storage 16. Also, debouncer 4 (DB4) is sent to a "One." Up-down counter 12 does not loose its count but continues to count up as one cycle per second pulses are received. The count at the moment G9 becomes a "zero" is merely also placed in temporary storage 16. Because the pulse is placed on the tape and up-down counter 12 is clocked when G3 goes to "zero" the system is stable when G3 goes to a "One," which is why G9 to "zero" is delayed until G3 goes to "One" before the count is transferred to temporary storage 16.

Since debouncer 4 is "One," G10 is "One," and since flip flop 5 is preset, G12, is also "One." When G3 goes to "zero" G11 becomes "One" and G13 goes to "zero," which sends G19 to "One" and clocks flip flop 6 of clock pulse to memory decoder 18. A "One" at G19 clocks flip flop 9 which gates G21. Flip flop 6 then allows 60 cycle per second clock pulses from clock 10 via G22 to go to the first memory of memories 20. The information appearing in temporary storage 16 is thereby clocked out of temporary storage and into the first memory of memories 20 at the 60 cycle per second rate. The first time the pilot pushes cue button 36 flip flop 6 is clocked to a "One" in Q which sends the data from temporary storage 16 to the first memory. The second time cue button 36 is pressed flip flop 6 in Q is "zero," flip flop 7 is clocked to a "One" in Q and the data from storage 16 goes to the second memory and so forth.

The clocking of flip flop 9 also removes the reset from counter 22 which may be model DM8333 or TI SN7493. This enables it to count. As each pulse from the 60 cycle per second source goes through G22 counter 22 is incremented by one. As the data is being shifted out of temporary storage 16 on each cue, counter 22 is being incremented by one at the rate of 60 cycles per second. When it reaches a count of 12 which coincides with the maximum amount of data that may be in temporary storage 16 (twelve bits maximum for the number of registers shown since there are 3 four bit registers shown), G25 becomes a "zero." A "zero" at G25 presets flip flop 9, clocks flip flop 5 and sends debouncer 4 to a "zero," causing G13 to go to a "One" which resets counter 22 and flip flop 5, and prevents the 60 cycle per second clock pulses from reaching memories 20. The data is now in the proper memory register and the system is ready for the next cue.

When the pilot wishes to replay a cued portion, he first stops the recorder. Then he selects the number of the cued portion he wishes to replay and presses the proper replay button of memory selector 24. That is, if he wishes to replay the first cued portion he presses replay number 1. This presets flip flop number 1. If he selected cue number 2, flip flop number 2 would be preset, and so on. G19 is sent to "zero" and flip flop 9 is clocked. The same process as from memory storage above is followed except the data is now shifted from the selected memory of memories 20 to temporary memories storage number 26. The data is also recirculated to the memory to prevent its loss. The pilot now presses compare button 38 which presets flip flop 10 and causes G28 to go to a "One." Comparator 12 is enabled by "One" at G28. If the count in up-down counter 28 is greater than the number in temporary memory storage 26 comparitor 28 causes tape drive command circuit 30 to automatically rewind the tape. Up-down counter 12 follows the pulses on the tape and counts down as the tape is rewound. When the count in up-down counter 12 equals the number in temporary memory storage 26 comparitor 28 causes tape drive command circuit 30 to instruct the recorder to stop. The instruction will also be coupled to monostable one-shot 40 which will disable comparitor 28 by way of G27. Comparitor 28 will be disabled for a period long enough for the recorder to come to a stop.

It is likely that the count in up-down counter 12 will now be less than the number in temporary memory storage 26 since the recorder will take a finite time to stop, especially if it has reached full rewind speed. When the RC time constant of monostable one-shot 40 is reached, comparitor 28 will again be enabled and the recorder instructed to run forward. The process will continue until the recorder does not overshoot the cued portion. In the embodiment shown the selected portion is normally arrived at after one overshoot in each direction.

The selected portion is now available for the pilot's viewing. To do so he presses play button 42. This also resets flip flop 10 so that after viewing the selected portion he can select another cued portion or reexamine the same one. The present invention may be modified to provide a still picture for the pilot's examination or to also include other information on the tape.

To those skilled in the art it will be obvious upon a study of this disclosure that the present invention permits a variety of modifications and hence can be given embodiments other than particularly illustrated and described herein, without parting from the essential features of the invention and within the scope of the claims annexed hereto.

What is claimed is:

1. A system that automatically retrieves previously identified portions of a recorded tape on selection by an operator, comprising:

tape recording means for recording information on a recording tape;

means for recording electronic time marks on said tape at uniformly spaced increments of time while simultaneously recording information on said tape;

means for counting said time marks such that said count increases as the tape passes said counting means in one direction and decreases as it passes in the other direction;

means for storing selected counts of said counting means as they occur such that the count identifying the location of selected portions of the recorded material is stored;

electronic means for comparing a selected stored count with the count of said counting means; and means for controlling said tape recording means in response to said comparison such that said tape is automatically positioned with respect to said counting means whereat said selected stored count equals the count of said counting means;

whereby a preselected portion of recorded information is automatically retrived on request by the operator.

2. The system of claim 1 wherein said system comprises a digital electronic circuit.

3. The system of claim 2 wherein said time mark recording means includes a clock that provides said time marks.

4. The sytem of claim 3 wherein said counting means includes a digital shift register coupled to said time mark recording means and said tape recording means that clock up one count as each time mark is provided for said tape and clock down one count as each time mark passes the playback head in rewind.

5. The system of claim 4 wherein said storing means includes a cue operated by an operator for selecting portions of said information for further retrieval and a plurality of shift registers coupled to said shift register of said counting means for temporarily storing the count appearing in the shift registers of said counting means on said cue by said operator.

6. A digital electronic circuit for automatically retrieving previously identified portions of a recorded tape on selection by an operator comprising:

tape recording means for recording information on a recording tape;

a clock for recording electronic time marks on said tape at uniformly spaced increments of time;

a digital shift register for counting said time marks coupled to said clock and said tape recording means such that said register clocks up one count as each time mark is provided for said tape and clocks down one count as each time mark passes a playback head in rewind;

a cue operated by an operator for selecting portions of said information for further retrieval;

a plurality of shift registers coupled to said counting shift register for temporarily storing said count appearing in said counting shift registers on said cue by said operator;

a clock pulse to memory decoder coupled to said clock and said cue;

a plurality of memory registers coupled to said temporary storage shift registers and said clock pulse to memory decoder such that the count appearing in said counting shift registers is temporarily stored in said temporary storage shift registers on said cue and clocked into said memory registers by said clock pulse to memory decoder, wherein the count on each cue is stored in a separate memory register;

electronic means for comparing a selected stored count with said count of said counting shift register; and means for controlling said tape recording means in response to said comparison such that said tape is automatically positioned with respect to said counting shift register whereat said selected stored count equals said count of said counting shift register;

whereby a preselected portion of recorded information is automatically retrieved on request by said operator.

7. The circuit of claim 6 wherein each count is clocked into its memory register at a rate sixty times faster than said time marks are provided.

8. The circuit of claim 7 wherein said comparing means includes a plurality of memory selectors equal to the number of memory registers wherein each memory selector coincides with its respective memory register such that the operator can select any one of the counts stored in said memory registers at a time by selecting the corresponding memory selector, which selected count is automatically compared with the count then appearing in said shift counting registers.

9. The circuit of claim 8 wherein said comparing means further includes shift registers coupled to said memory registers for temporarily storing said selected count from said memory registers, comparator registers coupled to said temporary memory storage registers and said counting shift registers, and a compare switch operable by said operator for comparing said selected count with the count then appearing in said counting shift registers in said comparator, wherein the count then appearing in said counting shift register identifies the current position of said tape.

10. The circuit of claim 9 wherein said controlling means includes a circuit coupled to said comparator for commanding the drive mechansim of said tape recording means such that said tape is driven to cause the count appearing in said counting shift register to equal said selected count.

* * * * *